United States Patent
Ogino et al.

(10) Patent No.: US 7,394,362 B2
(45) Date of Patent: Jul. 1, 2008

(54) PORTABLE DEVICE FOR ELECTRONIC KEY SYSTEM AND PORTABLE DEVICE SEARCH SYSTEM

(75) Inventors: Kenichi Ogino, Toyota (JP); Hiromichi Naito, Okazaki (JP)

(73) Assignee: Denso Corporation, Kariya (JP)

( * ) Notice: Subject to any disclaimer, the term of this patent is extended or adjusted under 35 U.S.C. 154(b) by 390 days.

(21) Appl. No.: 11/178,381

(22) Filed: Jul. 12, 2005

(65) Prior Publication Data
US 2006/0028339 A1    Feb. 9, 2006

(30) Foreign Application Priority Data
Aug. 6, 2004    (JP)    ............... 2004-231142

(51) Int. Cl.
*G08B 1/08* (2006.01)
*H04Q 7/00* (2006.01)

(52) U.S. Cl. .................. 340/539.11; 340/539.13; 340/539.32

(58) Field of Classification Search ............ 340/539.11, 340/539.13, 539.32, 10.1; 455/66, 68, 67.7, 455/88, 566; 342/126, 146
See application file for complete search history.

(56) References Cited

U.S. PATENT DOCUMENTS

| | | | | |
|---|---|---|---|---|
| 6,084,517 | A | * | 7/2000 | Rabanne et al. .......... 340/573.4 |
| 6,133,832 | A | * | 10/2000 | Winder et al. ............ 340/572.1 |
| 6,166,652 | A | * | 12/2000 | Benvenuti .............. 340/825.49 |
| 6,392,592 | B1 | * | 5/2002 | Johnson et al. ........ 342/357.07 |
| 6,909,964 | B2 | * | 6/2005 | Armstrong et al. .......... 701/207 |
| 7,034,684 | B2 | * | 4/2006 | Boman et al. ............ 340/568.1 |
| 2003/0095039 | A1 | | 5/2003 | Shimomura et al. ....... 340/426.1 |
| 2003/0134600 | A1 | * | 7/2003 | Picone et al. ................. 455/68 |

FOREIGN PATENT DOCUMENTS

| | | |
|---|---|---|
| JP | A-10-317748 | 12/1998 |
| JP | A-2000-170420 | 6/2000 |
| JP | A-2000-326827 | 11/2000 |

* cited by examiner

*Primary Examiner*—Toan N. Pham
(74) *Attorney, Agent, or Firm*—Posz Law Group, PLC (57) ABSTRACT

A portable device search system for an electronic key system is formed by a portable device and handy equipment such as a cellular phone, PDA and the like, which is separate from the portable device. When a predetermined operation is performed on the handy equipment, the handy equipment transmits a search signal. On receiving the search signal, the portable device generates a specific sound and vibration to notify the location. In addition, an image near the portable device may be transmitted to the handy equipment to be displayed on the handy equipment.

12 Claims, 10 Drawing Sheets

FIG. 11B ns # PORTABLE DEVICE FOR ELECTRONIC KEY SYSTEM AND PORTABLE DEVICE SEARCH SYSTEM

CROSS REFERENCE TO RELATED APPLICATION

This application is based on and incorporates herein by reference Japanese Patent Application No. 2004-231142 filed on Aug. 6, 2004.

FIELD OF THE INVENTION

The present invention relates to a portable device of an electronic key system and a portable device search system.

BACKGROUND OF THE INVENTION

An electronic key system for a motor vehicle is conventionally known. In this system, in response to a request (transmission request signal) transmitted from an on-vehicle device, a portable device as an electronic key carried by a user of a vehicle transmits a reply signal containing an identification code. If the code that the on-vehicle device receives from the portable device matches a code stored in advance in a memory of the on-vehicle device, predetermined operations such as door unlocking/locking and engine startup are performed. Such an electronic key system is generally referred to as a smart key system or a smart keyless entry system [e.g., JP-2000-170420 and U.S. 2003/0095039 A1 (JP-2003-157483)].

In the above electronic key system, desired functions (door unlocking, locking, etc.) are achieved if the user only carries the portable device without performing intentional operations on the portable device. Therefore, the user often leaves the portable device in a bag, a purse, a jacket pocket or the like. As a result, the user often forgets where the portable device was put, and has difficulty in locating the lost portable device.

SUMMARY OF THE INVENTION

The present invention therefore has an object of enabling easy detection of a portable device as an electronic key in an electronic key system even if it is lost.

According to one aspect of the present invention, a portable device search system for an electronic key system comprises a portable device forming a part of the electronic key system, and handy equipment separate from the portable device. The handy equipment transmits a search signal when a predetermined operation is performed on the handy equipment. The portable device performs a reporting operation for reporting a current position of the portable device on receiving the search signal from the handy equipment.

Preferably, the handy equipment displays current position information of the portable device in a display part thereof. This information may be position information (latitude, longitude) of the portable device. However, to make the position of the portable device more legible, for example, like on-vehicle navigation devices, not only is a map containing a current position of the portable device displayed, but also the current position of the portable device may be displayed so as to be identifiable by a specific mark. If the portable device calculates a current position from a received GPS signal and transmits a signal indicating the current position as a response signal, the handy equipment can immediately recognize the current position of the portable device. If the portable device transmits the contents of received GPS signals as a response signal without calculating a current position from the GPS signals, the handy equipment may calculate a current position of the portable device from the response signal.

More preferably, the handy equipment displays distance information indicating a distance from the portable device, for example, the reception strength of a response signal from the portable device without modification. In this case, if a conversion table for converting reception strength displayed in the display part to distances is prepared in advance, the user can determine a distance from the portable device from the conversion table. If the handy equipment calculates a distance from the portable device based on the reception strength of a response signal from the portable device and displays the value of the calculated distance in the display part as distance information, the user can know a distance from the portable device merely by seeing the display contents, with increased usability.

According to another aspect of the present invention, the portable device has a camera and a memory. When a predetermined photographing operation is performed, the portable device stores image data photographed by the camera in the memory and transmits the image data stored in the memory to the handy equipment. The handy equipment transmits a search signal when a predetermined operation is performed thereon to receives the image data from the portable device, and displays an image represented by the image data in a display part thereof. Alternatively, the portable device may immediately transmit image data photographed by the camera to the handy equipment. The handy equipment may store it and display it in the display part.

BRIEF DESCRIPTION OF THE DRAWINGS

The above and other objects, features and advantages of the present invention will become more apparent from the following detailed description made with reference to the accompanying drawings. In the drawings:

FIGS. 2A and 2B are flowcharts showing processing performed to achieve a first search function, wherein

FIGS. 3A and 3B are flowcharts showing processing performed to achieve a second search function in the first embodiment, wherein

FIGS. 4A and 4B are flowcharts showing processing performed to achieve a third search function, wherein

FIGS. 5A and 5B are flowcharts showing processing performed to achieve a fourth search function, wherein

FIGS. 9A and 9B are flowcharts showing processing performed in a portable device search system according to a third embodiment of the present invention, wherein

FIGS. 11A and 11B are flowcharts showing processing performed in a portable device search system according to a fourth embodiment of the present invention, wherein

DETAILED DESCRIPTION OF THE PREFERRED EMBODIMENT

A portable device search system will be described in detail with reference to various embodiments. Portable devices used as search objects in the embodiments are those carried with a user as electronic keys in electronic key systems for motor vehicles. The electronic key systems serve as smart key systems (smart keyless entry systems) in which doors are unlocked when an authorized portable device (portable device dedicated to a vehicle) enters a wireless communication area around the vehicle. It also serves as remote keyless entry systems (RKE) in which doors are locked and unlocked by the user's pressing buttons provided in the authorized portable device.

First Embodiment

Figure 1:
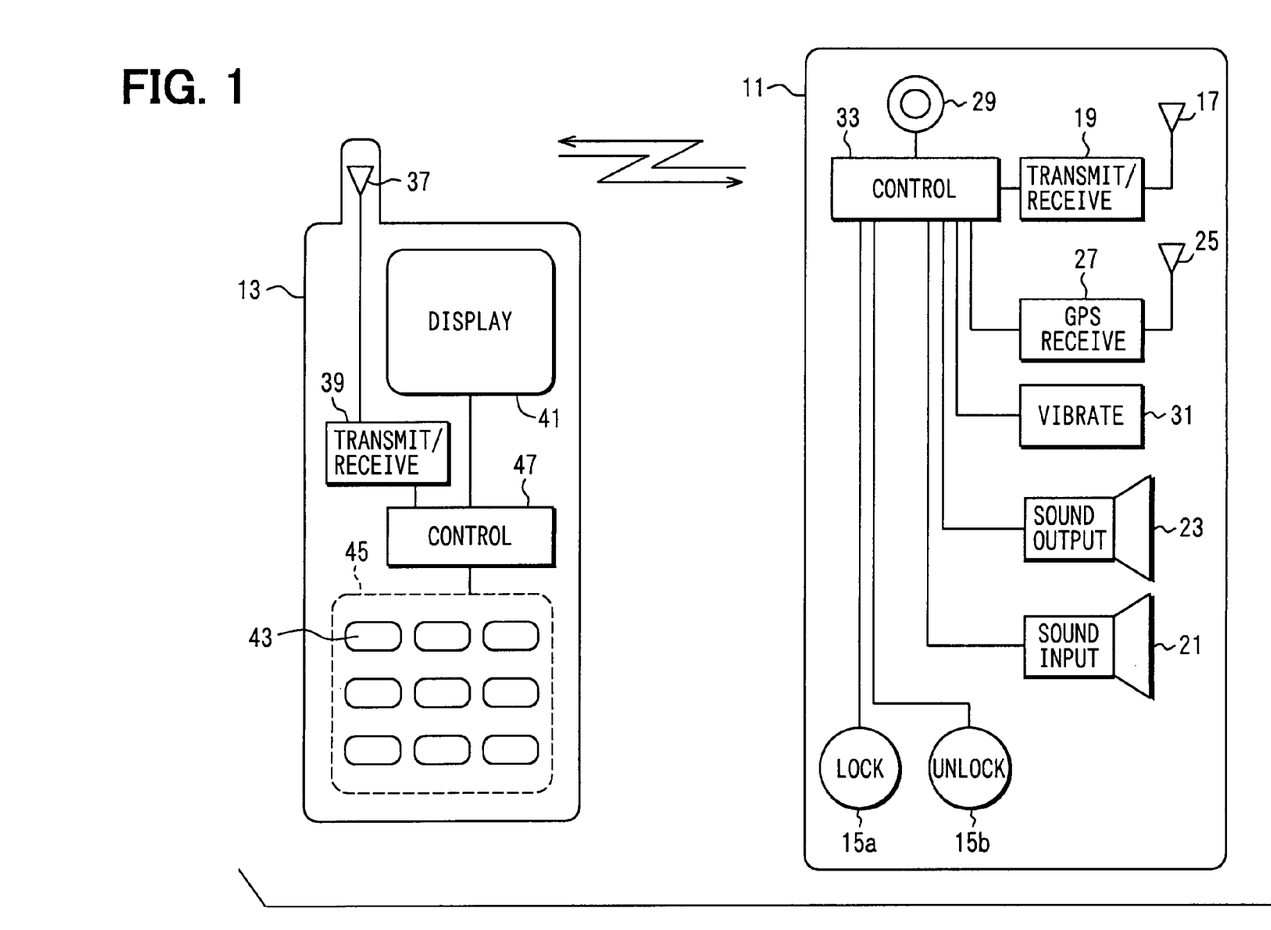
FIG. 1 is a block diagram showing a portable device search system according to a first embodiment of the present invention.

Referring first to FIG. 1, a portable device search system comprises a portable device 11 of an electronic key system of a vehicle and handy equipment 13. Both the portable device 11 and the handy equipment 13 are held by a user. The handy equipment 13 is separate from the portable device 11. The handy equipment 13, which is mobile equipment such as a cellular phone and PDA in this embodiment, may be any handy equipment such as a remote controller for other equipments such as television sets and air conditioners, or a remote controller dedicated to the search system.

The functions of the electronic key system (functions of a smart key system and RKE) in which the portable device 11 is used will be summarized though well-known. A vehicle has: a transmitter (on-vehicle transmitter) that transmits a transmission request signal to a wireless communication area around the vehicle; a receiver (on-vehicle receiver) that receives radio waves from the portable device 11; and a control unit (on-vehicle control unit) connected to the transmitter and the receiver.

(1) Function of a Smart Key System (1-1) The on-vehicle control unit periodically transmits a transmission request signal from the on-vehicle transmitter.

(1-2) When the portable device 11 enters a wireless communication area in which the transmission request signal can be received, and receives the transmission request signal, as a reply signal, it transmits a smart radio wave containing a smart ID code specific to a vehicle corresponding to the portable device 11.

(1-3) When the smart radio wave from the portable device 11 is received by the on-vehicle receiver during parking in which all doors of the vehicle are closed and locked, the on-vehicle control unit determines whether the smart ID code contained in the received radio wave matches a smart ID code (smart ID code specific to the vehicle in which the control unit is mounted). If they match, it permits the doors to be unlocked. Furthermore, with the doors permitted to be unlocked, for example, by a signal from a touch sensor provided in an external door knob of a driver's seat compartment, on detecting that a person touches the door knob, the on-vehicle control unit drives a door lock motor to unlock all doors.

(2) Function of RKE (2-1) In the RKE, when a user of the vehicle presses a lock button 15a or an unlock button 15b of the portable device 11, an RKE radio wave containing an RKE ID code specific to the vehicle corresponding to the portable device 11 is transmitted from the portable device 11. When the lock button 15a of the portable device 11 is pressed, operation command information indicating a door lock operation is contained in the RKE radio wave. When the unlock button 15b is pressed, operation command information indicating a door unlock operation is contained in the RKE radio wave. The lock button 15a and the unlock button 15b of the portable device 11 are switches of button type that are turned on when pressed.

(2-2) When the RKE radio wave from the portable device 11 is received by the on-vehicle receiver, the on-vehicle control unit determines whether the RKE ID code contained in the received radio wave matches an RKE ID code (RKE ID code specific to the vehicle in which the control unit is mounted). If they match, according to the above operation command information contained in the received radio wave together with the RKE ID code, drives the door lock motor to lock or unlock all doors.

In the search system of the first embodiment, the portable device 11 includes: an antenna 17 and a transmitting/receiving part 19 for performing wireless communications with the handy equipment 13; a sound input part 21 comprising a microphone for inputting sounds from the exterior; a sound output part 23 comprising a speaker for outputting sounds; an antenna 25 and a GPS receiving part 27 for receiving GPS signals from a GPS satellite; a photographing part 29 comprising a camera for photographing a surrounding area of the cellular phone 11; a vibration part 31 comprising a motor for generating vibration; and a control part 33 comprising a microcomputer responsible for the operation of the portable device 11. The antenna 17 and the transmitting/receiving part 19 may be different from an antenna and a transmitting/receiving part for performing wireless communications with the above on-vehicle control unit, or may be shared with them.

The handy equipment 13 includes: an antenna 37 and a transmitting/receiving part 39 for performing wireless communications with the portable device 11; a display part 41 comprising a liquid crystal display and the like; an operation part 45 in which plural buttons including a search button 43 and plural numeric buttons (buttons marked with a number) are arranged; and a control part 47 comprising a microcomputer responsible for the operation of the handy equipment 13 for searching for the portable device 11.

Each of the control part 47 of the handy equipment 13 and the control part 33 of the portable device 11 performs processing to enable the user to easily locate the portable device 11.

Figure 2A:
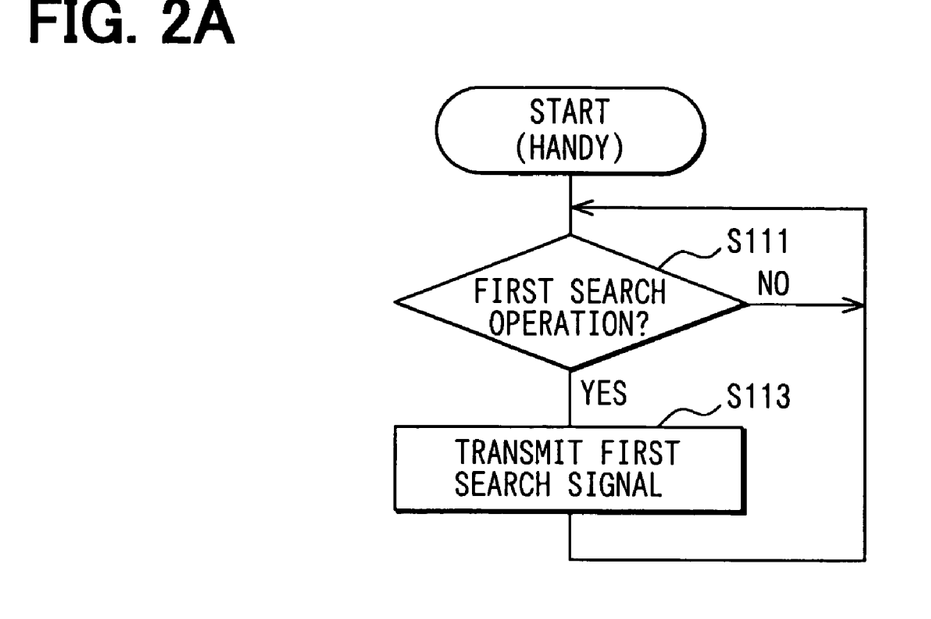
FIG. 2A shows processing performed in handy equipment (mobile equipment) and FIG. 2B shows processing performed in a portable device (electronic key)

As shown in FIG. 2A, the control part 47 of the handy equipment 13 determines in S111 whether a first search operation has been performed by the user, and waits until the first search operation is performed. The first search operation denotes such an operation that the search button 43 of the buttons of the search part 45 is pressed, then a button marked with a number "1" is pressed.

If the first search operation has been performed (S111: YES), in the next S113, the control part 47 feeds transmission data indicating a first search function to the transmitting/receiving part 39 to transmit a first search signal containing the data from the antenna 37, then repeats to execute S111.

Figure 2B:
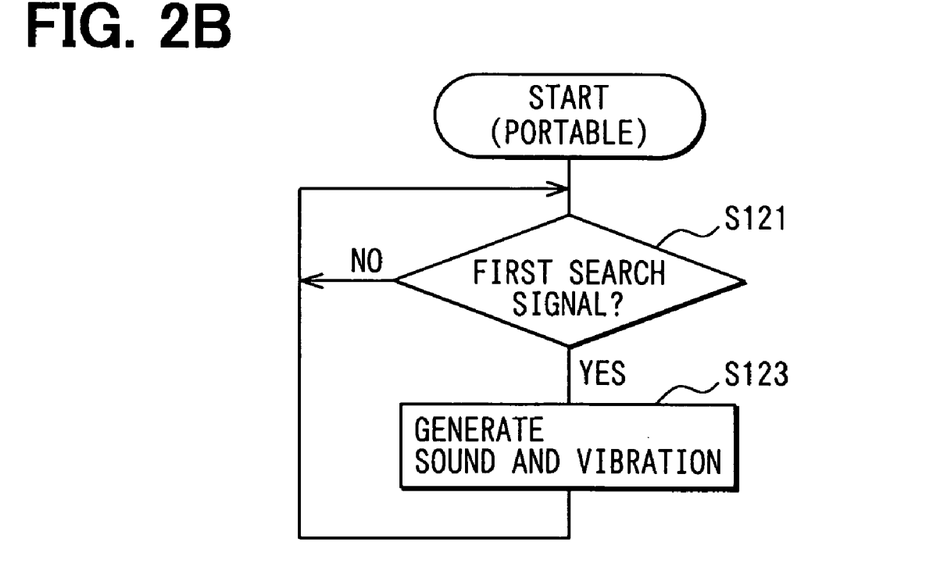

On the other hand, as shown in FIG. 2B, the control part 33 of the portable device 11 determines in S121 whether the first search signal from the handy equipment 13 has been received by the antenna 17 and the transmitting/receiving part 19, and waits until the first search signal is received.

When the first search signal has been received (S121: YES), in the next S123, the control part 33 generates vibration in the vibration part 31 while generating a specific sound (buzzer sound) in the sound output part 23 for a specified time, and then repeats to execute S121.

Figure 3A:
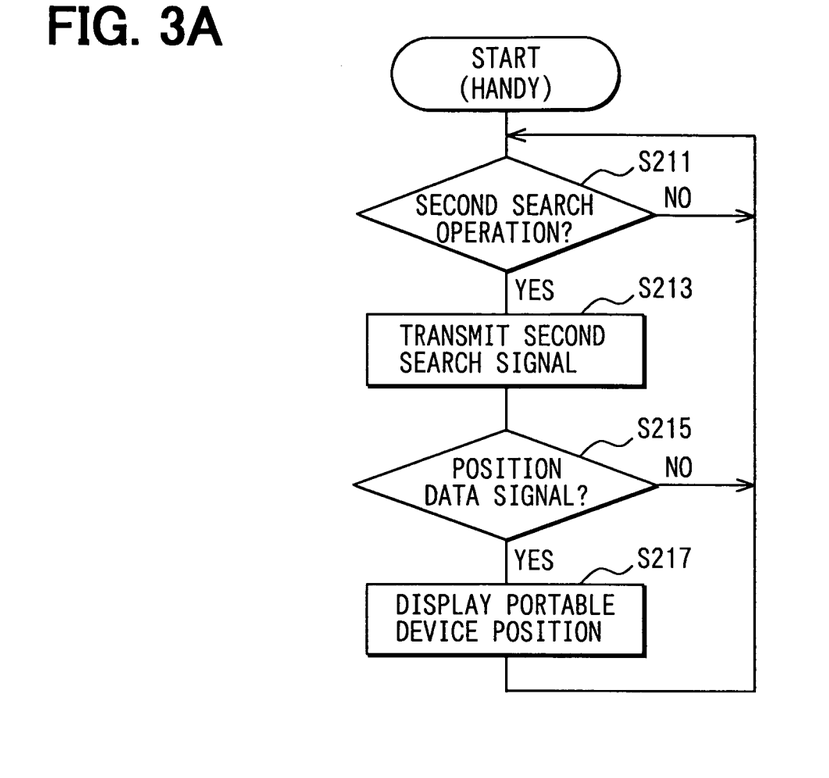
FIG. 3A shows processing performed in handy equipment (mobile equipment) and FIG. 3B shows processing performed in a portable device (electronic key)

As shown in FIG. 3A, the control part 47 of the handy equipment 13 determines in S211 whether a second search operation has been performed by the user, and waits until the second search operation is performed. The second search operation denotes such an operation that the search button 43 of the buttons of the search part 45 is pressed and then a button marked with a number "2" is pressed.

If the second search operation has been performed (S211: YES), in the next S213, the control part 47 feeds transmission data indicating a second search function to the transmitting/receiving part 39 to transmit a second search signal containing the data from the antenna 37.

From the portable device 11, by processing of S225 in FIG. 3B described later, a position data signal indicating a current position of the portable device 11 is returned as a response signal. Accordingly, in the next S215, the control part 47 of the handy equipment 13 determines whether the position data signal from the portable device 11 has been received by the antenna 37 and the transmitting/receiving part 39 within a specified time after the second search signal had been transmitted in S213.

If the position data signal from the portable device 11 has not been received (S215: NO), the control part 47 repeats to execute S211. If the position data signal is received (S215: YES), the control part 47 proceeds to S217 and displays current position information of the portable device 11 in the display part 41 based on the received position data signal. Specifically, the control part 47 displays a map containing a current position of the portable device 11 in the display part 41 and displays the current position of the portable device 11 on the displayed map distinguishably by a specific mark and color, then repeats to execute S211.

Figure 3B:
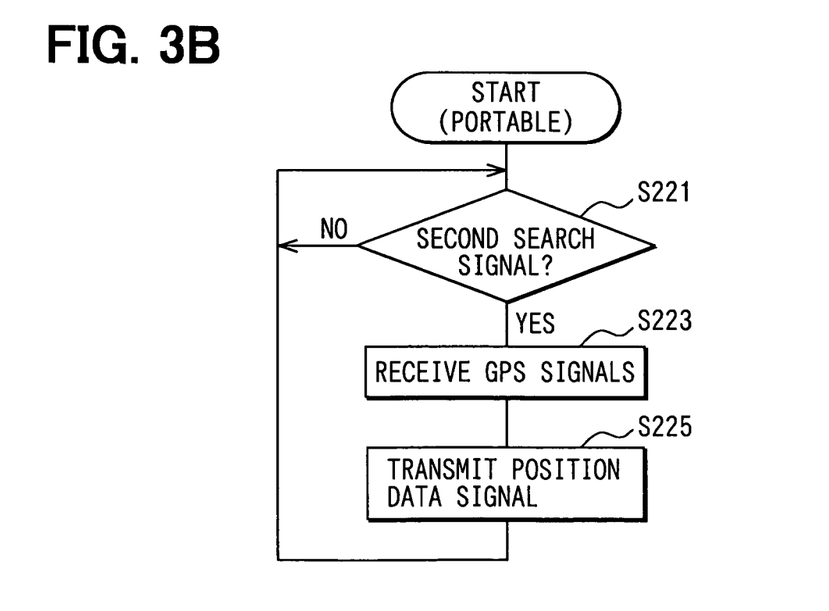

On the other hand, as shown in FIG. 3B, the control part 33 of the portable device 11 determines in S221 whether the second search signal from the handy equipment 13 has been received by the antenna 17 and the transmitting/receiving part 19, and waits until the second search signal is received.

When the second search signal has been received (S221: YES), in the next S223, the control part 33 receives GPS signals from GPS satellites by the antenna 25 and the GPS receiving part 27. Furthermore, in S225, the control part 33 calculates a current position of the portable device 11 from the received GPS signals, feeds position data indicating the current position to the transmitting/receiving part 19, transmits a position data signal containing the position data from the antenna 17 as a response signal, and repeats to execute S221.

Figure 4A:
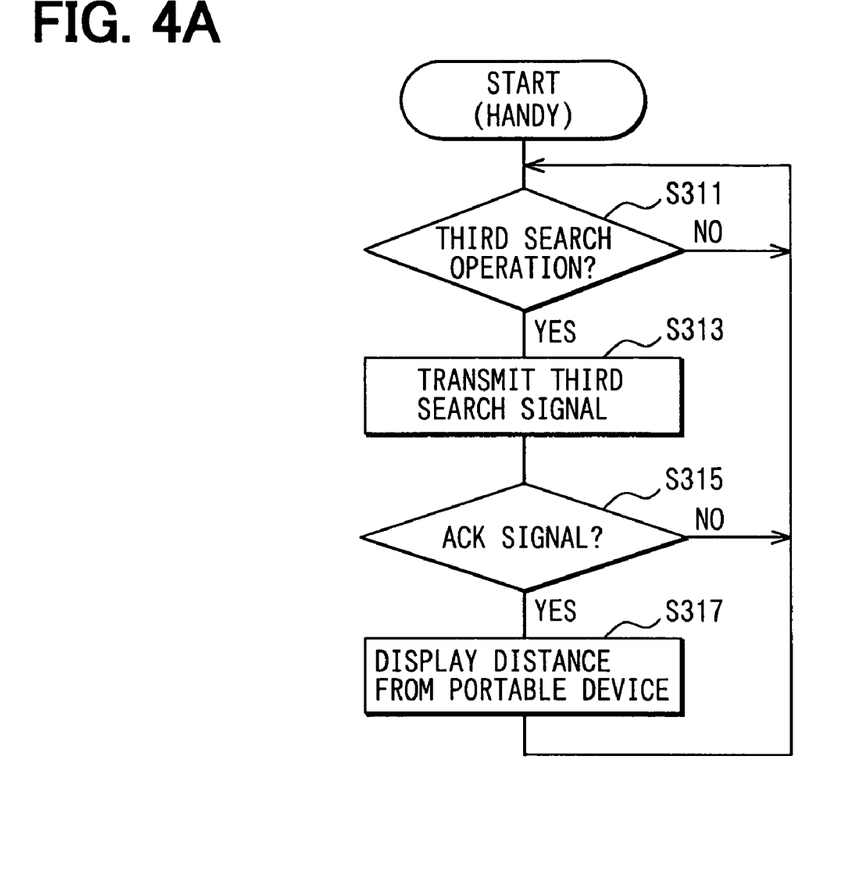
FIG. 4A shows processing performed in handy equipment (mobile equipment) and FIG. 4B shows processing performed in a portable device (electronic key)

As shown in FIG. 4A, the control part 47 of the handy equipment 13 determines in S311 whether a third search operation has been performed by the user, and waits until the third search operation is performed. The third search operation denotes such an operation that the search button 43 of the buttons of the search part 45 is pressed and then a button marked with a number "3" is pressed.

If the third search operation has been performed (S311: YES), in the next S313, the control part 47 feeds transmission data indicating a third search function to the transmitting/receiving part 39 to transmit a third search signal containing the data from the antenna 37.

From the portable device 11, by processing of S323 in FIG. 4B described later, an ACK (acknowledgement) signal is returned as a response signal indicating that the third search signal has been received. Accordingly, in the next S315, the control part 47 of the handy equipment 13 determines whether the ACK signal from the portable device 11 has been received by the antenna 37 and the transmitting/receiving part 39 within a specified time after the third search signal had been transmitted in S313.

If the ACK signal from the portable device 11 has not been received (S315: NO), the control part 47 repeats to execute S311. If the ACK signal is received (S315: YES), the control part 47 proceeds to S317, calculates a distance from the portable device 11 based on the reception strength of the received ACK signal, displays the value of the calculated distance in the display part 41 as distance information, and then repeats to execute S311.

Figure 4B:
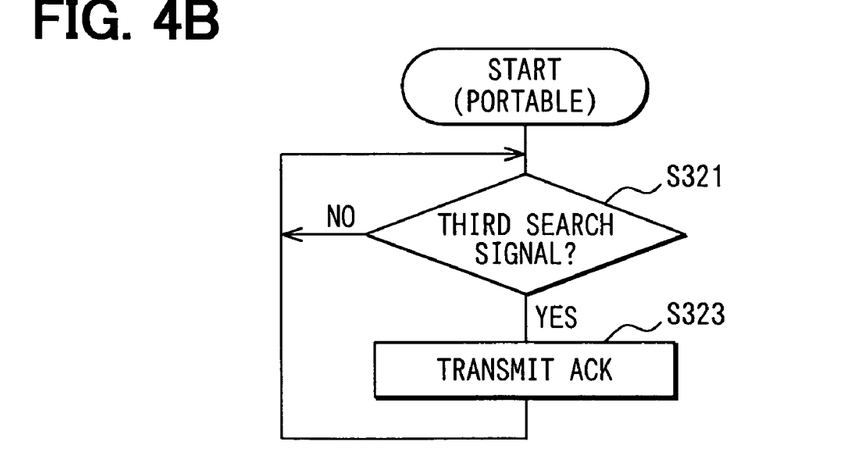

On the other hand, as shown in FIG. 4B, the control part 33 of the portable device 11 determines in S321 whether the third search signal from the handy equipment 13 has been received by the antenna 17 and the transmitting/receiving part 19, and waits until the second search signal is received.

If the third search operation signal has been received (S321: YES), in the next S323, the control part 33 feeds ACK data indicating that the third search signal has been received, to the transmitting/receiving part 19, transmits an ACK signal containing the data from the antenna 17 and then repeats to execute S321.

Figure 5A:
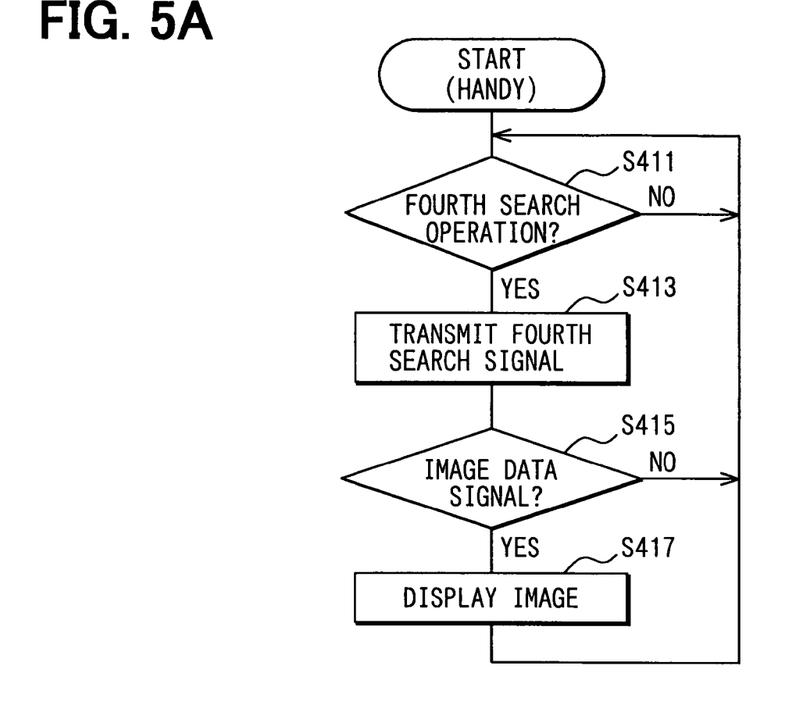
FIG. 5A shows processing performed in handy equipment (mobile equipment) and FIG. 5B shows processing performed in a portable device (electronic key)
Figure 5B:
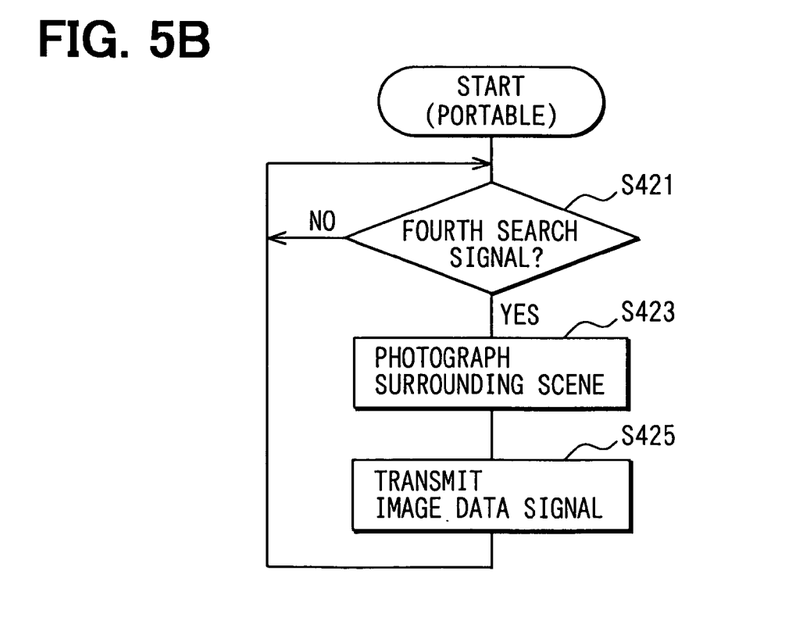

FIG. 5 is a flowchart showing processing performed to achieve a fourth search function, wherein FIG. 5A shows processing performed in the control part 47 of the handy equipment 13, and FIG. 5B shows processing performed in the control part 33 of the portable device 11.

As shown in FIG. 5A, the control part 47 of the handy equipment 13 determines in S411 whether a fourth search operation has been performed by the user, and waits until the fourth search operation is performed. The fourth search operation denotes such an operation that the search button 43 of the buttons of the search part 45 is pressed and then a button marked with a number "4" is pressed.

If the fourth search operation has been performed (S411: YES), in the next S413, the control part 47 feeds transmission data indicating a fourth search function to the transmitting/receiving part 39 to transmit a fourth search signal containing the data from the antenna 37.

From the portable device 11, by processing of S425 in FIG. 5B described later, an image data signal containing the image data of the surrounding area of the portable device 11 photographed in the photographing part 29 is returned. Accordingly, in the next S415, the control part 47 of the handy equipment 13 determines whether the image data signal from the portable device 11 has been received by the antenna 37 and the transmitting/receiving part 39 within a specified time after the fourth search signal had been transmitted in S413.

If the image data signal from the portable device 11 has not been received (S415: NO), the control part 47 repeats to execute S411. If the image data signal is received (S415:

YES), the control part 47 proceeds to S417 and displays an image (that is, the image of the photographed surrounding area of the portable device 11) represented by the image data contained in the received image data signal.

On the other hand, as shown in FIG. 5B, the control part 33 of the portable device 11 determines in S421 whether the fourth search signal from the handy equipment 13 has been received by the antenna 17 and the transmitting/receiving part 19, and waits until the fourth search signal is received.

If the fourth search signal has been received (S421: YES), in the next S423, the control part 33 activates the photographing part 29. The photographing part 29 photographs its front scenes in the vicinity of the portable device 11.

Furthermore, in S425, the control part 33 feeds the image data photographed by the photographing part 29 to the transmitting/receiving part 19 to transmit an image data signal containing the image data from the antenna 17, and repeats to execute S421.

Figure 6:
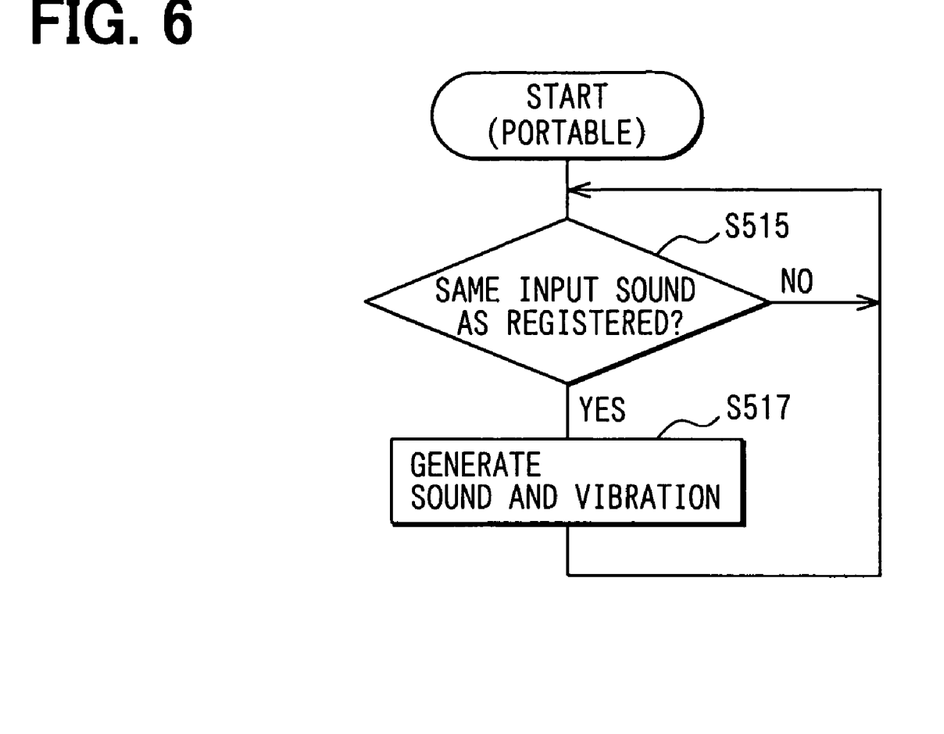
FIG. 6 is a flowchart showing processing performed in a portable device (electronic key) to achieve a fifth search function.

It is also possible to locate the portable device 11 without the handy equipment 13 as shown in FIG. 6. In this case, the control part 33 of the portable device 11 controls a sound registration operation by the user. As the sound registration operation, an operation not related to the normal functions of the portable device 11 is performed; for example, the lock button 15a and the unlock button 15b are pressed consecutively twice at the same time within a specified time. This may be done at any time other than searching for the portable device 11.

If a sound such as user's voiced words is input, the control part 33 analyzes sound inputted from the sound input part 21, stores (registers) the contents of words indicated by the sound in an internal memory as registration sound.

When the user needs to search the portable device 11, the user voices words at a place where the portable device 11 will be located. The control part 33 analyzes the sound inputted by the sound input part 21 and determines at S515 whether the sound is a sound representing the same words as the registered sound. In short, it determines whether the registration sound has been inputted.

When determining that no registration sound is inputted (S515: NO), the control part 33 repeats to execute S515. When determining that the registration sound is inputted (S515: YES), it proceeds to S517 to generate vibration in the vibration part 31 while generating a specific sound (buzzer sound) in the sound output part for a specific period of time, and then repeats to execute S515. This vibration and the specific sound will indicate the place of location of the portable device 11.

In registering the user words, the quality of inputted sound (sound quality) may also be stored in the memory. In S515, when sound by the sound input part 21 has stored sound quality and is a sound representing the stored words, it may be determined that registration sound has been inputted.

According to the portable device search system, when the user forgets where the portable device 11 is kept, he or she can easily locate the portable device 11 by performing the above first to fourth search operations on the handy equipment 13.

Specifically, when the first search operation is performed on the handy equipment 13, the first search signal is transmitted from the handy equipment 13 to the portable device 11 (S111: YES, S113). On receiving the first search signal (S121: YES), the portable device 11 generates a specific sound and vibration (S123). As a result, the user can easily determine the position of the portable device 11 by the sound and vibration from the portable device 11. The first search function is effective particularly when the portable device 11 is comparatively near the user (e.g., pockets of user's clothes and a carried bag). The portable device 11 may be constructed to generate only one of sound and vibration.

When the second search operation is performed for the handy equipment 13, the second search signal is transmitted from the handy equipment 13 to the portable device 11 (S211: YES, S213). On receiving the second search signal (S221: YES), the portable device 11 receives GPS signals (S223), calculates a current position from the received GPS signals, and transmits a position data signal containing position data indicating the calculated current position to the handy equipment 13 (S225). Based on the position data signal from the portable device 11, the handy equipment 13 displays current position information of the portable device 11 in the display part 41 (S215: YES, S217). As a result, the user can easily determine the position of the portable device 11 from information displayed in the display part 41 of the handy equipment 13. The second search function is effective particularly when the portable device 11 is comparatively distant from the user (specifically, a place distant than the resolution of position measuring by the GPS signal).

In this case, the portable device 11 calculates a current position from GPS signals and returns a position data signal indicating the current position to the handy equipment 13. However, in S225 of FIG. 3B, the portable device 11 may transmit a signal indicating the contents of the GPS signals (information such as the position and time of the GPS satellites) received in S223 as a response signal. The handy equipment 13 may calculate a current position of the portable device 11 based on the signal from the portable device 11, and display the calculated current position in the display part 41 in S217 of FIG. 3A.

When the third search operation is performed for the handy equipment 13, the third search signal is transmitted from the handy equipment 13 to the portable device 11 (S311: YES, S313). On receiving the third search signal (S321: YES), the portable device 11 transmits an ACK signal to the handy equipment 13 (S323). The handy equipment 13 calculates a distance from the portable device 11 based on the reception strength of the ACK signal from the portable device 11, and displays the value of the calculated distance in the display part 41 (S315: YES, S317). Therefore, the user can know a distance from the portable device 11 from the value displayed in the display part 41 of the handy equipment 13, and can easily locate the portable device 11 from the distance. The third search function is effective particularly when the distance between the user and the portable device 11 is greater than effective distances (e.g., within several meters) of the first search function and smaller than effective distances (e.g., several tens of meters or longer) of the second search function.

The handy equipment 13 may, in S317 of FIG. 4A, display the value of reception strength of the ACK signal in the display part 41 as information about distance from the portable device 11. In this case, if a conversion table for converting the values of reception strength displayed in the display part 41 into distances is prepared in advance, the user can know distance from the portable device 11 from the conversion table.

When the fourth search operation is performed for the handy equipment 13, the fourth search signal is transmitted from the handy equipment 13 to the portable device 11 (S411: YES, S413). On receiving the fourth search signal (S421: YES), the portable device 11 photographs the surrounding area of the cellular phone 11 by the photographing part 29 (S423), and transmits image data produced by the photographing to the handy equipment 13 (S425). The handy equipment 13 displays an image representing the image data from the portable device 11 in the display part 41 (S415: YES, S417). Therefore, the user can determine the position of the lost portable device 11 from the image displayed in the display part 41. The fourth search function can determine the position of the portable device 11 more correctly in combination with the first to third search functions.

On the other hand, according to the search system of the first embodiment, when searching for the lost portable device 11, the user can locate it by the fifth search function if it is comparatively near the user, even when not holding the handy equipment 13 in hand.

The user has only to issue the same words as registration sound registered in advance in the portable device 11. This is because if user's sound arrives in the portable device 11 and it is determined that registration sound has been inputted (S515: YES), like the first search function, specific sound and vibration are issued from the portable device 11 (S517). The portable device 11 may be constructed to generate only one of sound and vibration in S517 of FIG. 6.

By the first to fifth search functions described above, the user can efficiently locate the lost portable device 11.

Second Embodiment

Figure 7:
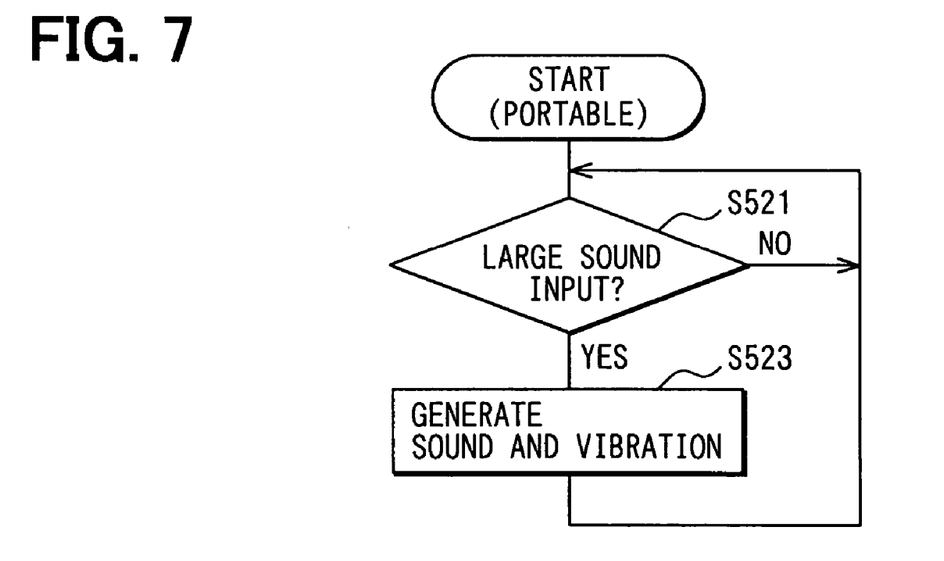
FIG. 7 is a flowchart showing processing performed in portable device (electronic key) to achieve a sixth search function in a portable device search system according to a second embodiment of the present invention.

A portable device search system according to the second embodiment is different from that of the first embodiment only in that the control part 33 of the portable device 11 performs processing of FIG. 7 to achieve a sixth search function instead of processing of FIG. 6.

As shown in FIG. 7, the control part 33 of the portable device 11 determines in S521 whether the magnitude of a sound inputted by the sound input part 21 is equal to or greater than a specified value (whether a volume equal to or greater than the specified value has been inputted), and waits until a volume equal to or greater than the specified value is inputted. On determining that a volume equal to or greater than the specified value has been inputted (S521: YES), the control part 33 proceeds to execute S523 to generate vibration in the vibration part 31 while generating a specific sound (buzzer sound) in the sound output part 23 for a specified time, and then repeats to execute S521.

Also in the search system of the second embodiment, when searching for the lost portable device 11, the user can easily locate it by the sixth search function if it is comparatively near the user, even when not holding the handy equipment 13 in hand.

That is, if such a noise as to cause positive determination in S521 of FIG. 7 is made by issuing sound or tapping something, like the fifth search function in the first embodiment, specific sound and vibration are generated from the portable device 11 (S523). In S523 of FIG. 7, only one of sound and vibration may be generated.

Third Embodiment

Figure 8:
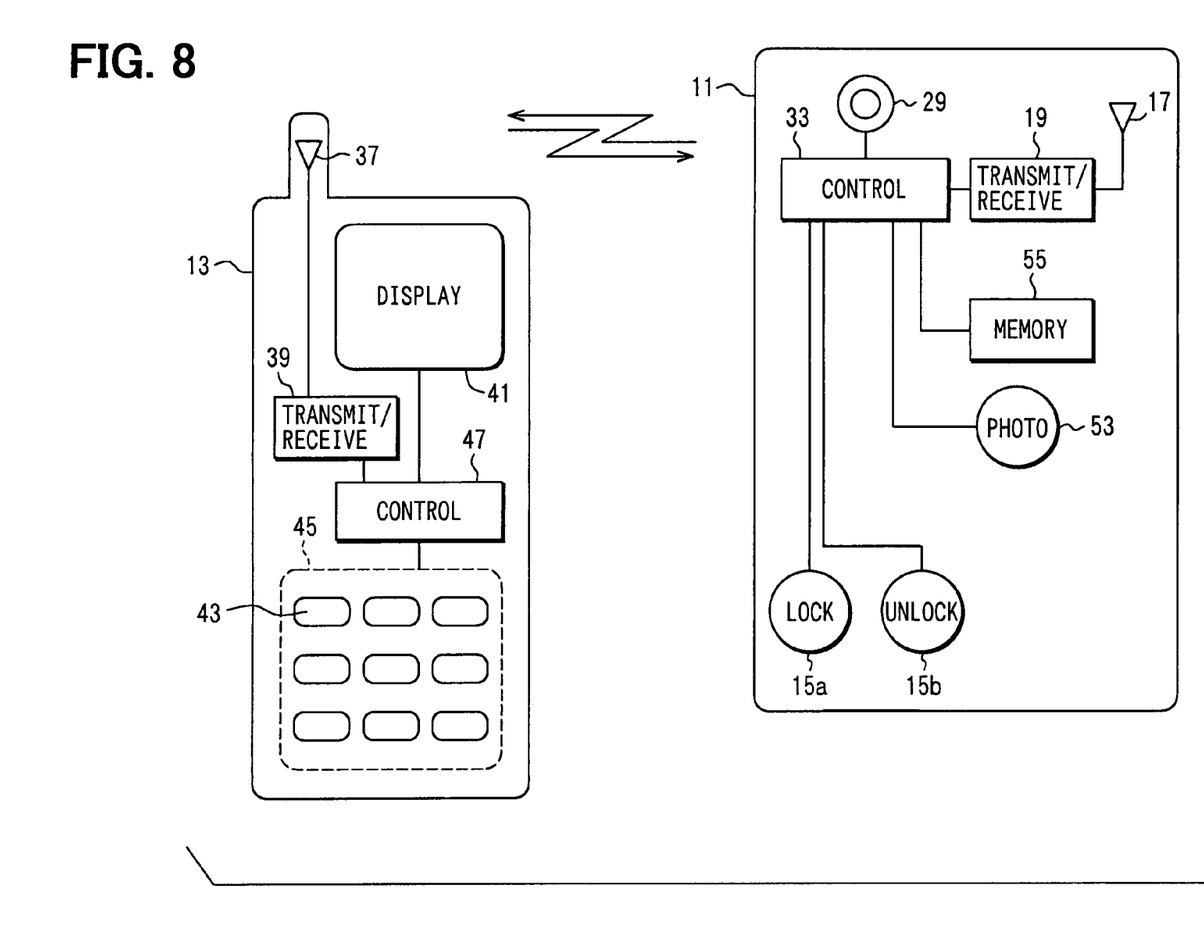
FIG. 8 is a block diagram showing a portable device search system according to a third embodiment of the present invention.

As shown in FIG. 8, a portable device search system according to a third embodiment is different from that of the first embodiment in the construction of the portable device 11 as an electronic key to search for. The portable device 11 do not have the sound input part 21, sound output part 23, antenna 25 and GPS receiving part 27 for receiving GPS signals and vibration part 31. Instead, it has a photographing button 53 operated to activate the photographing part 29, and a memory part 55 for storing data for locating the portable device 11. The handy equipment 13 is the same as that of the first embodiment.

Figure 9A:
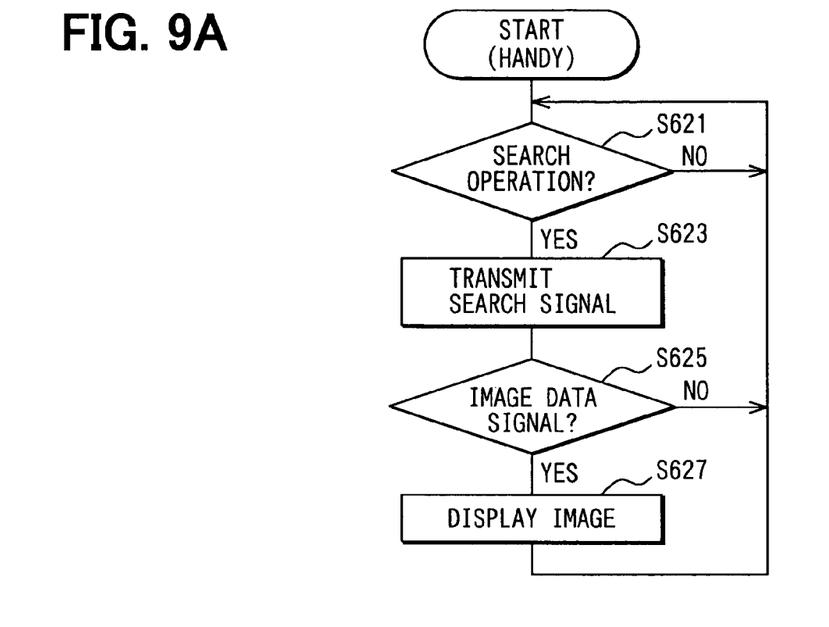
FIG. 9A shows processing performed in handy equipment (mobile equipment) and FIG. 9B shows processing performed in a portable device (electronic key)
Figure 9B:
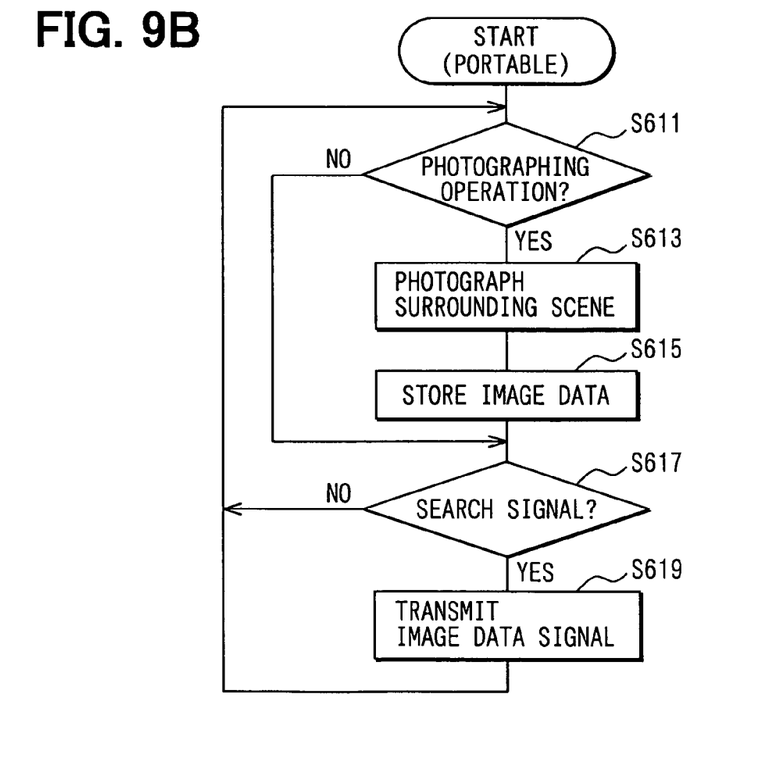

As shown in FIG. 9B, the control part 33 of the portable device 11 determines in S611 whether the photographing button 53 has been operated (pressed) by the user. On determining that the photographing button 53 has not been operated, the control part 33 proceeds to S617. On determining that the photographing button 53 has been operated (S611: YES), the control part 33 proceeds to S613 to activate the photographing part 29. In the next S615, the control part 33 stores image data photographed by the photographing part 29 in S613, then proceeds to S617.

In S617, the control part 33 determines whether a search signal from the handy equipment 13 has been received by the antenna 17 and the transmitting/receiving part 19, and repeats to execute S611 if it has not been received.

In S617, on determining that the search signal has been received, the control part 33 proceeds to S619 to feed the image data stored in the memory 55 to the transmitting/receiving part 19 and transmit an image data signal containing the image data from the antenna 17, and then repeats to execute S611.

On the other hand, as shown in FIG. 9A, the control part 47 of the handy equipment 13 determines in S621 whether a search operation has been performed by the user, and waits until a search operation is performed. As the search operation, the search button 43 of the operation part 45 is pressed.

If the search operation has been performed (S621: YES), in the next S623, the control part 47 feeds transmission data indicating a search function to the transmitting/receiving part 39 to transmit a search signal containing the data from the antenna 37.

The portable device 11 receives the search signal and returns the image data signal by processing of S619 in FIG. 9B described previously. Therefore, the control part 47 of the handy equipment 13 determines in the next S625 whether the image data signal from the portable device 11 has been received by the antenna 37 and the transmitting/receiving part 39 within a specified time after the search signal had been transmitted in S623.

If the image data signal from the portable device 11 has not been received (S625: NO), the control part 47 repeats to execute S621. If the image data signal has been received (S625: YES), the control part 47 proceeds to S627 to display an image (image photographed in S613 of FIG. 9B) represented by image data contained in the received image data signal in the display part. Then, the control part 47 repeats to execute S621.

The search system of the third embodiment is used as described below.

When storing the portable device 11, the user presses the photographing button 53 of the portable device 11 to photograph a storage place by the photographing part 29. Image data produced by the photographing is stored in the memory 55 of the portable device 11 (S615).

When the user forgets where the portable device 11 has been housed, he or she has only to press the search button 43 of the handy equipment 13.

Specifically, by operating the search button 43, the handy equipment 13 transmits the search signal (S621: YES, S623). On receiving the search signal, the portable device 11 transmits the image data stored in the memory 55 (image data produced by photographing the storage place of the portable device 11) to the handy equipment 13 (S617: YES, S619). Since the handy equipment 13 receives the image data and displays the image represented by the image data in the display part 41 (S625: YES, S627), the user can locate the storage place of the lost portable device 11 from the image displayed in the display part 41.

Therefore, also by the search system of the third embodiment, the user can easily locate the lost portable device 11.

The search system of the third embodiment may be varied as follows.

In processing of FIG. 9B performed in the control part 33 of the portable device 11, in S615, instead of storing the image data photographed by the photographing part 29 in the memory 55, the image data is fed to the transmitting/receiving part 19 to transmit the image data signal containing the image data from the antenna 17. In this case, the processing of S617 and S619 in FIG. 9B are omitted.

The control part 47 of the handy equipment 13 receives the image data signal transmitted from the portable device 11 in the above S615 of this variant by the antenna 37 and the transmitting/receiving part 39, and stores the image data contained in the received image data signal in a memory of the handy equipment 13.

The processing of S623 and S625 may be omitted from processing of FIG. 9A performed in the control part 47 of the handy equipment 13. When the control part 47 of the handy equipment 13 determines in S621 of FIG. 9A that a search operation has been performed (when the search button 43 has been pressed), it proceeds to S627 to display the image represented by the image data stored in a memory of the handy equipment 13 in the display part 41.

In this variant, the image data produced by photographing the storage place of the portable device 11 is not stored in the portable device 11 but in the storage part of the handy equipment 13.

Use of such a variant of the search system is the same as that of the search system of the third embodiment described previously.

When storing the portable device 11, the user presses the photographing button 53 of the portable device 11 to photograph a storage place by the photographing part 29. Image data produced by the photographing is transmitted to the handy equipment 13 and stored in the memory of the handy equipment 13. When the user forgets where the portable device 11 has been housed, if the search button 43 of the handy equipment 13 is pressed, the handy equipment 13 displays the image represented by the image data (image data produced by photographing the storage place of the portable device 11) stored in the storage part in the display part 41. Therefore, the user can locate the storage place of the lost portable device 11 from the image displayed in the display 41.

Such a variant of the search system is advantageous to miniaturize the portable device 11 because the memory 55 for storing image data may not be provided in the portable device 11.

Fourth Embodiment

Figure 10:
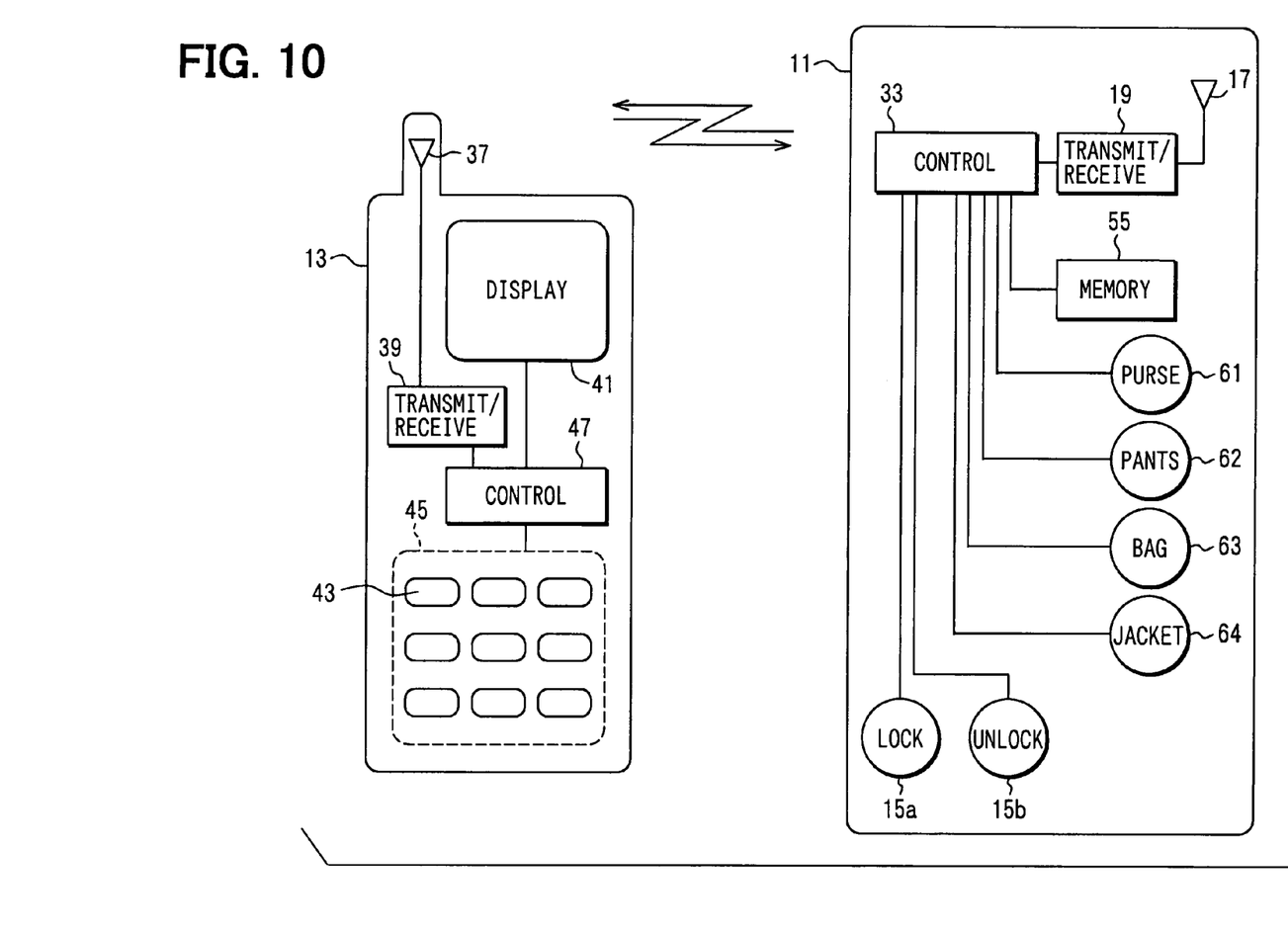
FIG. 10 is a block diagram showing the configuration of a search system of a fourth embodiment.

As shown in FIG. 10, a portable device search system according to a fourth embodiment is different from that of the third embodiment in the construction of the portable device 11 as an electronic key to search for. The portable device 11 of the fourth embodiment is different from the portable device 11 of the third embodiment in that the photographing part 29 and the photographing button 53 are not provided. Instead, plural storage place buttons 61 to 64 indicating storage place candidates for the portable device 11 are provided.

In this example, four storage place buttons 61 to 64 are provided. A button 61 is a purse button written as "Purse," a button 62 is a pants button written as "Pants," a button 63 is a bag button written as "Bag," and a button 64 is a jacket button written as "Jacket." On the other hand, the handy equipment 13 is the same as that of the first and the third embodiments.

Figure 11A:
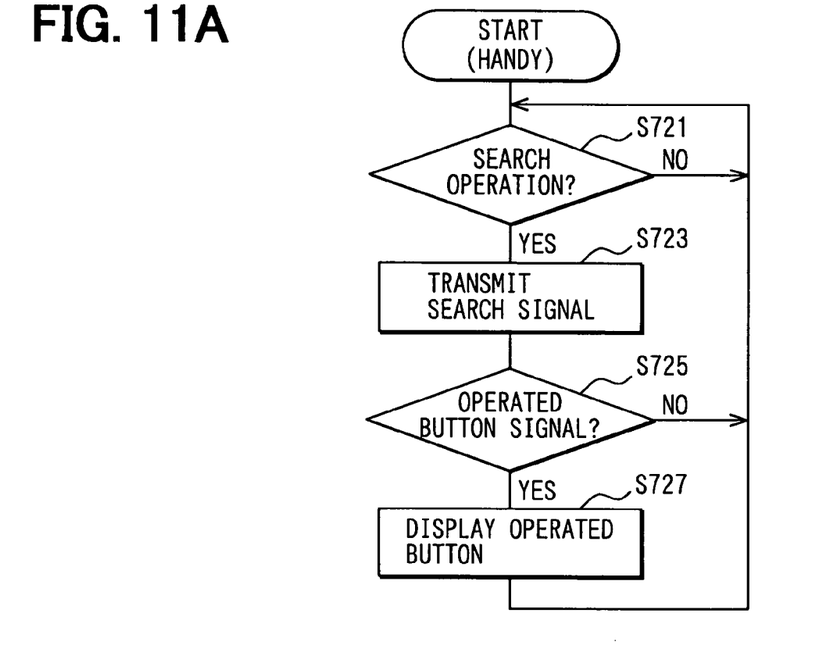
FIG. 11A shows processing performed in handy equipment (mobile equipment) and FIG. 11B shows processing performed in a portable device (electronic key).
Figure 11B:
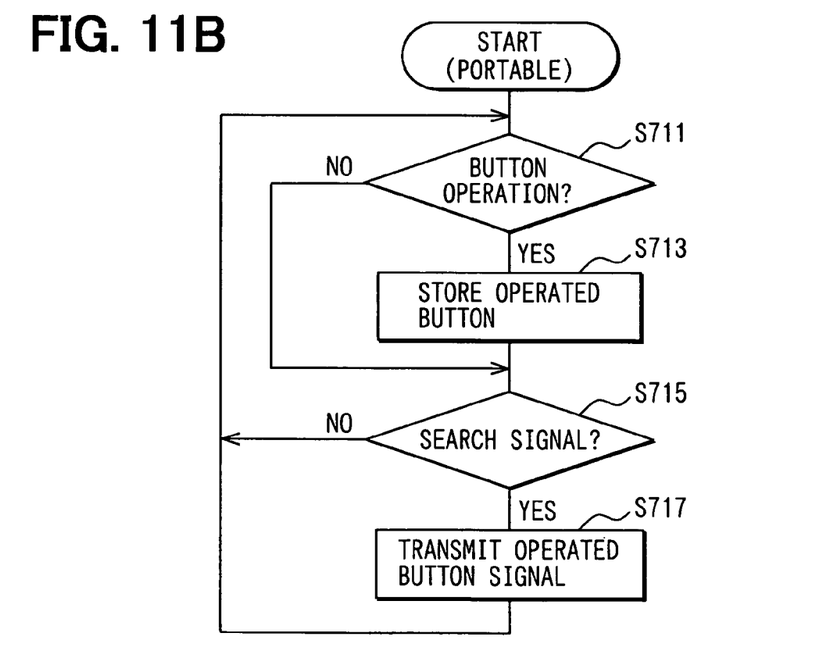

As shown in FIG. 11B, the control part 33 of the portable device 11 determines in S711 whether any of the storage place buttons 61 to 64 has been operated (pressed) by the user. On determining that any of the storage place buttons 61 to 64 is not operated (S711: NO), it proceeds to S715.

On determining in S711 that any of the storage place buttons 61 to 64 has been operated (S711: YES), the control part 33 proceeds to S713 to store the kind of any of the storage place buttons 61 to 64 operated this time (one of "Purse," "Pants," "Bag" and "Jacket," referred to as operated button) in the memory 55, and then proceeds to S715.

The control part 33 determines in S715 whether a search signal (described later) from the handy equipment 13 has been received by the antenna 17 and the transmitting/receiving part 19. If the search signal has not been received, the control part 33 repeats to execute S711.

On determining in S715 that the search signal has been received, the control part 33 proceeds to S717 to feed data indicating an operated button stored in the memory 55 to the transmitting/receiving part 19 and transmit an operated button signal containing the data from the antenna, and then repeats to execute S711.

On the other hand, as shown in FIG. 11A, the control part 47 of the handy equipment 13 determines in S721 whether a search operation has been performed by the user, and waits until the search operation is performed. As the search operation, like the third embodiment, the search button 43 of the operation part 45 is pressed.

If the search operation has been performed (S721: YES), in S723, the control part 47 feeds transmission data indicating a search function to the transmitting/receiving part 39 to transmit a search signal containing the data from the antenna 37.

The portable device 11 receives the search signal and returns the operated button signal by processing of S717 in FIG. 11B. Therefore, the control part 47 of the handy equipment 13 determines in S725 whether the operated button signal from the portable device 11 was received by the antenna 137 and the transmitting/receiving part 39 within a specified time after the search signal was transmitted in S723.

If the operated button signal from the portable device 11 has not been received (S725: NO), the control part 47 repeats to execute S721. If the operated button signal from the portable device 11 has been received (S725: YES), it proceeds to S727 to display an operated button (the kind of any of the storage place buttons 61 to 64 determined to have been operated in S711 of FIG. 11B) indicated by data contained in the received operated button signal, and then repeats to execute S721.

The search system of the fourth embodiment is used as described below.

When storing the portable device 11, the user presses any of the storage place buttons 61 to 64 to input the storage place of the portable device 11. That is, if the portable device 11 is put in a purse, the button (purse button) 61 is pressed. If the portable device 11 is put in a pocket of a pants, the button (pants button) 62 is pressed. If the portable device 11 is put in a bag, the bag (bag button) 63 is pressed. If the portable device 11 is put in a pocket of a jacket, the button (jacket button) 64 is pressed. The kind (the storage place of the portable device 11) of the pressed button 61 to 64 is stored in the storage part (S713).

When the user forgets where the portable device 11 has been housed, he or she has only to press the search button 43 of the handy equipment 13.

Specifically, by operating the search button 43, the handy equipment 13 transmits the search signal (S721: YES, S723). On receiving the search signal, the portable device 11 transmits the operated button signal indicating the operated button (the storage place of the portable device 11) stored in the memory 55 to the handy equipment 13 (S715: YES, S717). Since the handy equipment 13 receives the operated button signal from the portable device 11 and displays the operated button represented by data in the signal in the display part 41 (S725: YES, S727), the user can locate the storage place of the lost portable device 11 from the operated button displayed in the display part 41.

Therefore, also by the search system of the fourth embodiment, the user can easily locate the lost portable device 11.

The search system of the fourth embodiment may be varied as follows.

In processing of FIG. 11B performed in the control part 33 of the portable device 11, in S713, instead of storing the kind of any of the storage place buttons 61 to 64 operated by the user in the memory 55, data indicating the operated button may be fed to the transmitting/receiving part 19 to transmit an operated button signal containing the data from the antenna 17. In this case, the processing of S715 and S717 in FIG. 11B may be omitted.

The control part 47 of the handy equipment 13 may receive the image data signal transmitted from the portable device 11 in the S615 of this variant by the antenna 37 and the transmitting/receiving part 39, and stores the image data contained in the received image data signal in the storage part of the handy equipment 13.

The processing of S723 and S725 may be omitted from processing of FIG. 11A performed in the control part 47 of the handy equipment 13. When the control part 47 of the handy equipment 13 determines in S721 of FIG. 11A that a search operation has been performed (when the search button 43 has been pressed), it may proceed to S727 to display the operated button stored in the storage part of the handy equipment 13 in the display part 41.

In this variant, operated buttons corresponding to storage places of the portable device 11 are not stored in the portable device 11 but in the storage part of the handy equipment 13.

Use of such a variant of the search system is the same as that of the search system of the fourth embodiment described previously.

When storing the portable device 11, the user presses one of the storage place buttons 61 to 64 to input the storage place of the portable device 11. A signal indicating the kind (the storage place of the portable device 11) of the pressed one of the buttons 61 to 64 is transmitted to the handy equipment 13, and an operated button indicated by the signal is stored in the storage part of the handy equipment 13. When the user forgets where the portable device 11 has been housed, if the search button 43 of the handy equipment 13 is pressed, the handy equipment 13 displays the operated button (the storage place of the portable device 11) stored in the storage part in the display part 41. Therefore, the user can locate the storage place of the lost portable device 11 from information displayed in the display 41.

Such a variant of the search system is advantageous to reduce the portable device 11 in size because the memory 55 for storing a storage place of the portable device 11 may not be provided in the portable device 11.

Other modifications are also possible. For example, although, in the fourth embodiment and its variant, storage places of the portable device 11 are selectively inputted by pressing any of the storage places 61 to 64, the portable device 11 may be provided with buttons for inputting characters to input storage places of the portable device 11 by characters.

Although the search systems of the above embodiment and variants are used in an electronic key system for motor vehicle, the present invention can also apply to electronic key systems for other than motor vehicles.

What is claimed is:

1. A portable device search system for an electronic key system comprising:
    a portable device including a camera and forming a part of the electronic key system; and
    handy equipment separate from the portable device, wherein
    the handy equipment has a search signal transmitting means that transmits a search signal when a predetermined operation is performed on the handy equipment,
    the portable device has a reporting operation execution means that performs a reporting operation for reporting a current position of the portable device on receiving the search signal transmitted from the handy equipment,
    the reporting operation execution means is configured to activate the camera in the portable device to photograph a surrounding area of the camera and then transmit image data produced by the camera to the handy equipment as the reporting operation, and
    the handy equipment has a display part that displays an image represented by the image data.

2. The portable device search system according to claim 1, wherein:
    the reporting operation execution means is also configured to generate at least one of sound and vibration as the reporting operation.

3. The portable device search system according to claim 1, wherein:
    the reporting operation execution means is also configured to receive GPS signals as the reporting operation, and to transmit the current position calculated from the received GPS signals or a signal indicating the contents of the received GPS signals to the handy equipment as a response signal; and
    the display part of the handy equipment displays current position information of the portable device based on the response signal.

4. The portable device search system according to claim 1, wherein:
    the reporting operation execution means is also configured to transmit a response signal for the search signal to the handy equipment as the reporting operation; and
    the display part of the handy equipment displays a distance from the portable device based on a reception strength of the response signal.

5. The portable device search system according to claim 1, wherein:
    the portable device is an electronic key for a vehicle for remotely controlling a vehicle door locking and unlocking; and
    the handy equipment is a cell phone separately usable from the vehicle.

6. A portable device for an electronic key system comprising:
    a sound input means for inputting sounds from outside; and
    a determination means that determines whether a sound inputted by the sound input means is a sound registered in advance, characterized by
    a reporting operation execution means that performs a reporting operation for reporting a current position of the portable device when positive determination is made by the determination means.

7. The portable device of an electronic key system according to claim 6, wherein:

the reporting operation execution means generates at least one of sound and vibration as the reporting operation.

8. A portable device for an electronic key system comprising:
a sound input means for inputting sounds from outside; and
a determination means that determines whether a magnitude of a sound inputted by the sound input means is greater than a specified value, characterized by
a reporting operation execution means that performs a reporting operation for reporting a current position of the portable device when positive determination is made by the determination means.

9. A portable device search system for an electronic key system comprising:
a portable device forming a part of the electronic key system; and
a handy equipment separate from the portable device, characterized in that the portable device has:
a camera;
a storage means;
a place information storage control means that activates the camera when a predetermined photographing operation is performed, and stores image data photographed by the camera in the storage means; and
a response means that, on receiving a search signal transmitted from the handy equipment, transmits the image data stored in the storage means to the handy equipment,
wherein the handy equipment transmits the search signal when a predetermined operation is performed thereon to receives the image data from the portable device, and displays an image represented by the image data in a display part thereof.

10. A portable device search system of an electronic key system comprising:
a portable device forming a part of the electronic key system; and
a handy equipment separate from the portable device, characterized in that the portable device has:
a camera;
a place information transmitting means that activates the camera when a predetermined photographing operation is performed, and transmits image data photographed by the camera to the handy equipment,
wherein handy equipment receives the image data from the portable device and stores it in a storage means thereof, and displays an image represented by the image data stored in the storage means in a display part thereof.

11. A portable device search system for an electronic key system comprising:
a portable device forming a part of the electronic key system; and
a handy equipment separate from the portable device, characterized in that the portable device has:
a storage means;
a storage place input means for inputting a storage place of the portable device by a user;
a place information storage control means that stores the inputted storage place in the storage means when a storage place of the portable device is inputted by the storage place input means; and
a response means that transmits a response signal indicating the storage place stored in the storage means to the handy equipment on receiving a search signal transmitted from the handy equipment,
wherein the handy equipment receives the response signal transmitted from the portable device in response to a search signal generated when a predetermined operation is performed, and displays a storage place indicated by the response signal in a display part thereof.

12. A portable device search system for an electronic key system comprising:
a portable device forming a part of the electronic key system; and
a handy equipment separate from the portable device, characterized in that the portable device has:
a storage place input means for inputting a storage place of the portable device by a user; and
a place information transmitting means that transmits a response signal indicating an inputted storage place to the handy equipment when a storage place of the portable device is inputted by the storage place input means,
wherein the handy equipment receives the response signal transmitted from the portable device, stores the storage place of the portable device indicated by the response signal in a storage means thereof, and displays the storage place stored in the storage means in a display part thereof when a predetermined operation is performed.

* * * * *